(12) United States Patent
Willoquet

(10) Patent No.: US 8,870,154 B2
(45) Date of Patent: Oct. 28, 2014

(54) ACTUATOR FOR A SHUTTER, PARTICULARLY A FIREWALL SHUTTER

(75) Inventor: Jean-Baptiste Willoquet, Les Avenieres (FR)

(73) Assignee: Vraco SAS, Morestel (FR)

( * ) Notice: Subject to any disclaimer, the term of this patent is extended or adjusted under 35 U.S.C. 154(b) by 618 days.

(21) Appl. No.: 13/256,280

(22) PCT Filed: Mar. 19, 2010

(86) PCT No.: PCT/FR2010/050498
§ 371 (c)(1),
(2), (4) Date: Nov. 9, 2011

(87) PCT Pub. No.: WO2010/106298
PCT Pub. Date: Sep. 23, 2010

(65) Prior Publication Data
US 2012/0049098 A1    Mar. 1, 2012

(30) Foreign Application Priority Data
Mar. 20, 2009    (FR) ...................... 09 51781

(51) Int. Cl.
| | |
|---|---|
| F16K 31/44 | (2006.01) |
| F16K 31/02 | (2006.01) |
| F16K 17/38 | (2006.01) |
| F16K 31/56 | (2006.01) |
| F16K 31/00 | (2006.01) |

(52) U.S. Cl.
CPC .............. *F16K 31/003* (2013.01); *F16K 31/563* (2013.01)
USPC ........................... 251/67; 251/129.04; 137/79

(58) Field of Classification Search
USPC ................ 251/66, 67, 68, 70, 71, 74, 129.04; 137/78.5, 79, 80
See application file for complete search history.

(56) References Cited

U.S. PATENT DOCUMENTS

| | | | | |
|---|---|---|---|---|
| 1,461,231 A | * | 7/1923 | Sudderberg | 236/96 |
| 1,623,115 A | * | 4/1927 | Hensley | 251/70 |
| 2,276,195 A | * | 3/1942 | Holmes | 137/624.11 |
| 2,333,370 A | * | 11/1943 | Graham | 74/2 |
| 2,662,547 A | * | 12/1953 | Comeau | 137/468 |
| 2,809,662 A | * | 10/1957 | Ray | 137/614.17 |
| 3,082,627 A | * | 3/1963 | Yeo et al. | 74/2 |

(Continued)

FOREIGN PATENT DOCUMENTS

| | | |
|---|---|---|
| EP | 1830117 A1 | 9/2007 |
| FR | 2730546 A1 | 8/1996 |

OTHER PUBLICATIONS

Raw Machine Translation of EP1830117 (Vraco; Sep. 5, 2007) provided by the EPO.*

(Continued)

*Primary Examiner* — John K Fristoe, Jr.
*Assistant Examiner* — David Colon Morales
(74) *Attorney, Agent, or Firm* — Faegre Baker Daniels LLP

(57) ABSTRACT

The invention relates to a shutter actuator including a translatably guided carriage (10) rigidly connected to the shaft (4) in the housing (3), and comprises: a rack (11) that meshes with the cog (20) of the outlet shaft (4) linked to the flap (2-1) of the shutter (2); a bearing (13) for a triggering spring (70); a bearing member (12) for a cocking member (30) that drives the carriage (10); and a locking notch (14-1) for receiving a locking member (42) supported by a locking arm (40).

8 Claims, 7 Drawing Sheets

(56) References Cited

U.S. PATENT DOCUMENTS

| | | | | |
|---|---|---|---|---|
| 3,606,980 | A | * | 9/1971 | Simpson .......................... 251/66 |
| 4,533,114 | A | * | 8/1985 | Cory et al. ...................... 251/67 |
| 4,911,029 | A | * | 3/1990 | Banba et al. ........................ 74/2 |
| 4,951,915 | A | * | 8/1990 | Piao ................................ 251/14 |
| 5,238,220 | A | * | 8/1993 | Shell et al. ...................... 251/67 |
| 5,295,403 | A | * | 3/1994 | Sibley et al. ........................ 74/2 |
| 5,533,929 | A | * | 7/1996 | Attridge, Jr. .................. 454/369 |
| 6,491,055 | B2 | | 12/2002 | Brazier et al. |

OTHER PUBLICATIONS

Raw Machine Translation of FR2730546 (Vicenti, Aug. 14, 1996) provided by the EPO.*

English translation of the Written Opinion mailed Sep. 29, 2011 in parent application No. PCT/FR2010/050498.

* cited by examiner

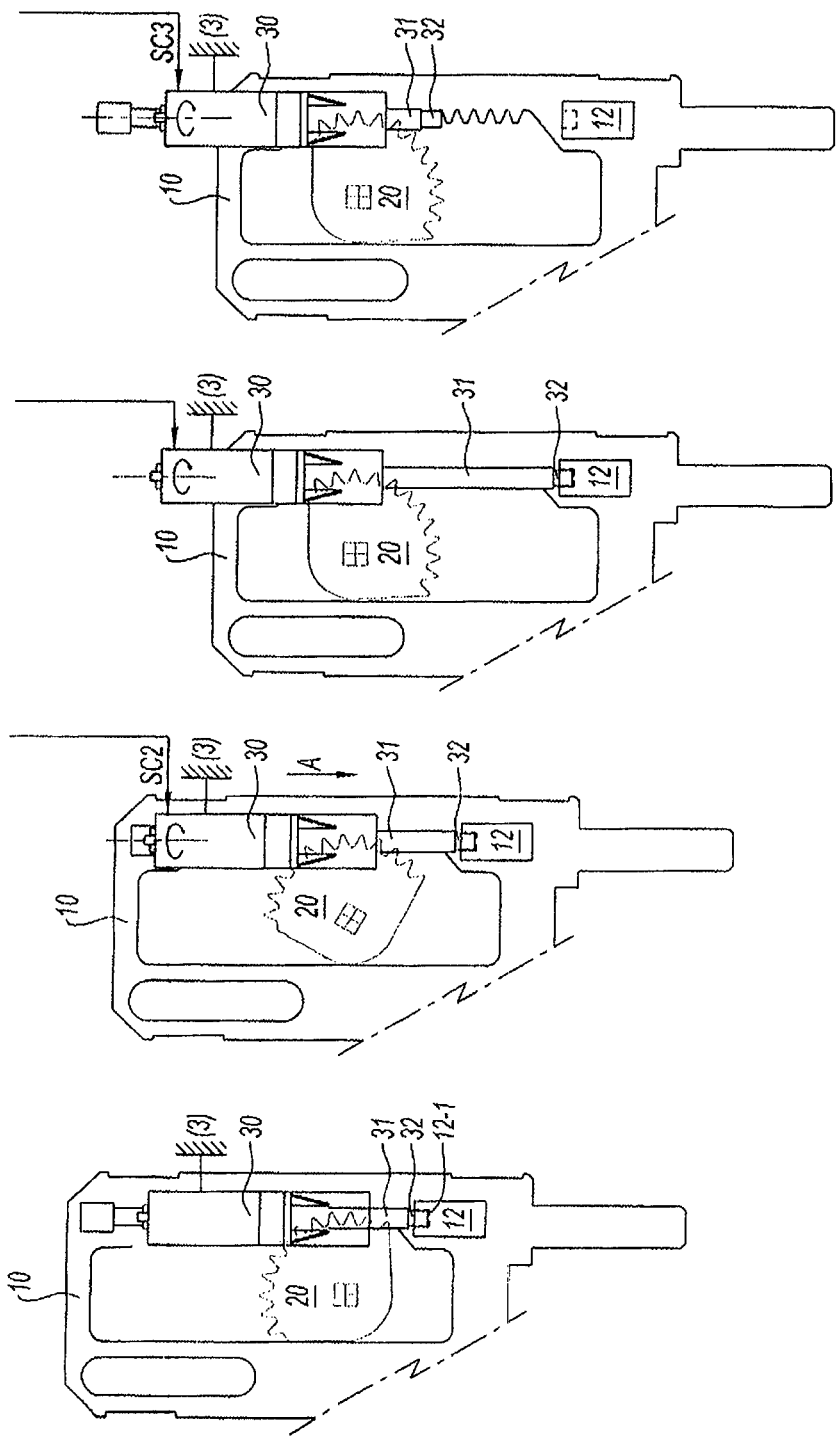

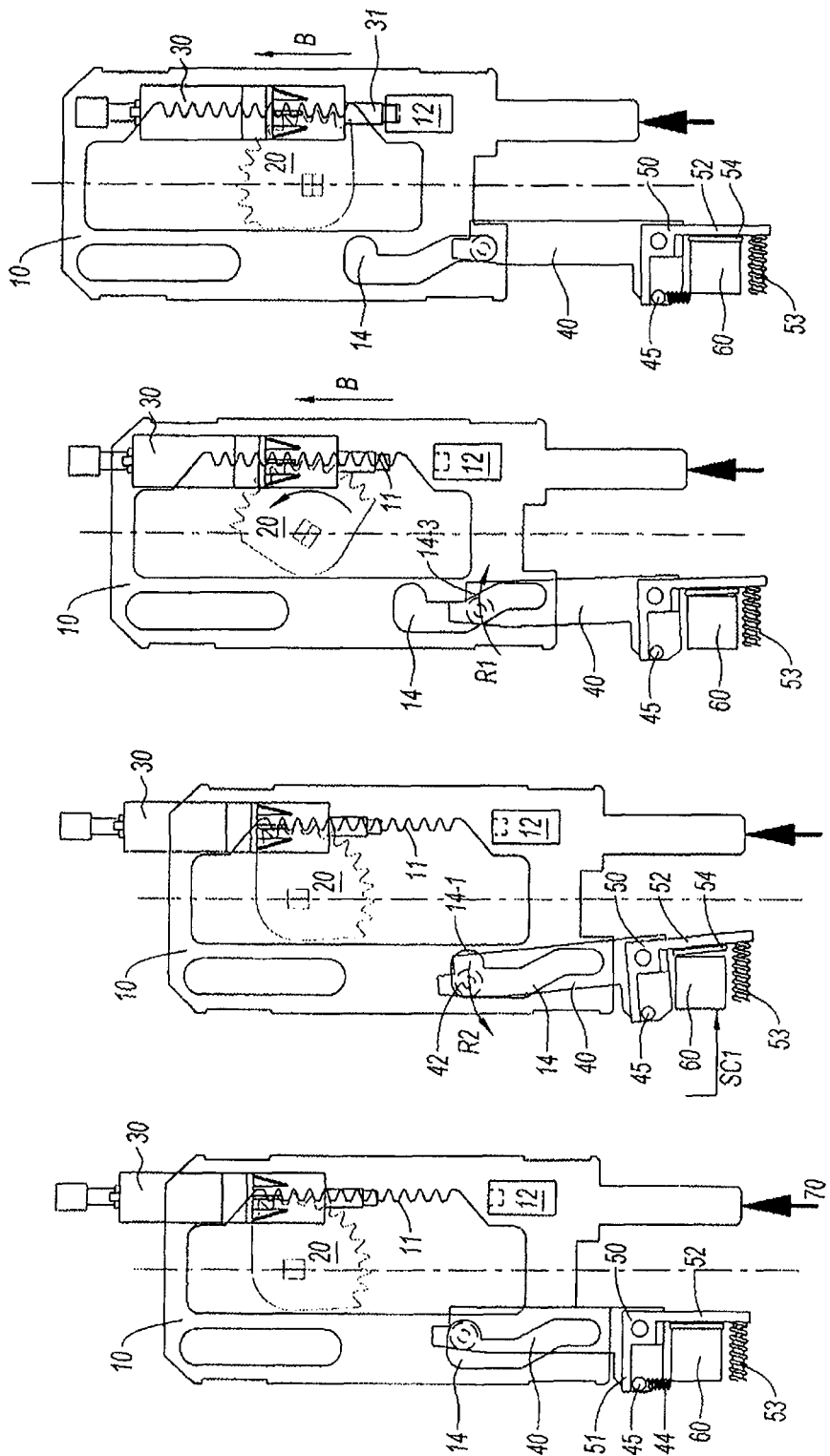

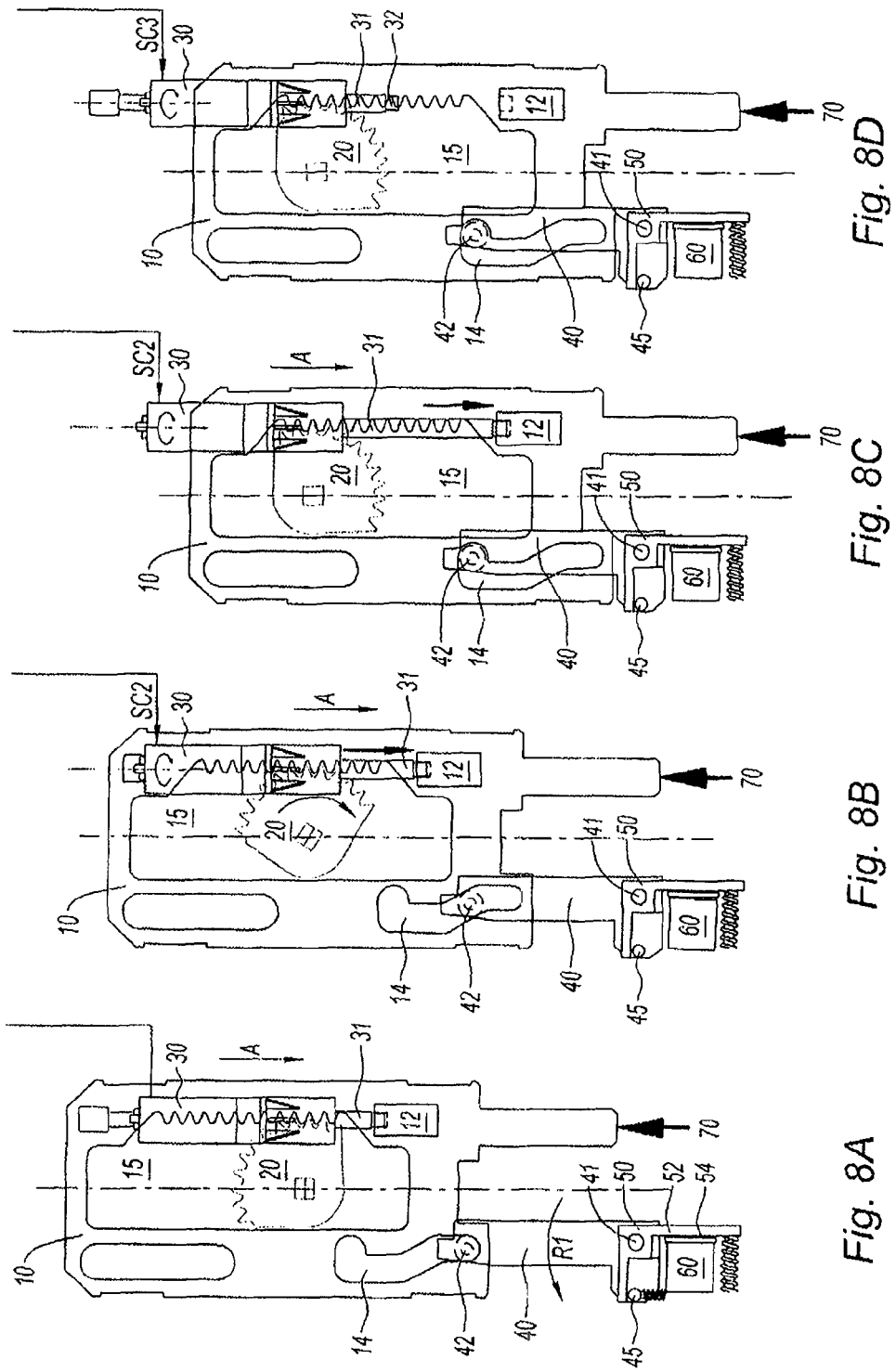

ACTUATOR FOR A SHUTTER, PARTICULARLY A FIREWALL SHUTTER

CROSS-REFERENCE TO RELATED APPLICATION

This application is a U.S. National Phase Patent Application based on International Application Serial No. PCT/FR2010/050498 filed Mar. 19, 2010, which is based on French Patent Application No. 0951781 filed Mar. 20, 2009, the disclosures of which is hereby explicitly incorporated by reference herein.

BACKGROUND OF THE INVENTION

1. Field of the Invention

The present invention relates to a valve actuator, in particular the flap of a fire stop valve.

2. Description of the Related Art

There are various embodiments of valve actuators, in particular for fire stop valves of the type defined above. However, they have the disadvantage of a relatively complex structure.

SUMMARY OF THE INVENTION

An object of the present invention is to develop a valve actuator, in particular in order to actuate the flap of a fire stop valve, which is simple to produce whilst ensuring complete reliability in terms of operation and actuation either in accordance with an actuation signal generated by a control circuit which processes the sensor signals, in particular signals from a safety sensor, or allowing controlled manual actuation under simple and safe operating conditions, which also facilitates maintenance work or interventions on the actuator.

To this end, the invention relates to a valve actuator of the type defined above, characterised in that the carriage which is guided in translation (in direction D) in the casing between the arming position (direction A) and the actuated position (direction B) comprises: a rack which engages with the pinion of the output shaft which is connected to the flap of the valve, an abutment for a mechanical actuation energy storage spring which acts in the actuation direction, an abutment member for an arming member which drives the carriage from its actuated position to its arming position in order to then become separated from the abutment member at the end of the arming travel, a locking recess for receiving a locking member which is carried by a locking arm, which is pivotably mounted and which is urged by a spring towards the locking position thereof, a lever which co-operates, on the one hand, with a solenoid actuator which retains the lever in a locked position and, on the other hand, with a spring which urges the lever towards the unlocked position and drives the arm towards the unlocked position, and a control circuit which provides the actuation command by means of an action on the solenoid actuator and on the actuation member for the arming movement of the carriage.

The actuator according to the invention has the advantage of being very simple to produce owing to the combination of the actuation operations carried out by one component, that is to say, the carriage, which allows the arming and opening movement of the flap and then the actuation movement of the flap by transmitting, during the arming movement, the action of a motor both to the shaft of the flap of the valve in order to open it and to the force storage spring.

In the armed position, the carriage ensures that the flap remains open and the energy storage spring remains in the biased position. Finally, in the actuation position, the carriage transmits the drive torque to the flap of the valve in order to close it by converting the translation movement under the urging of the helical storage spring to the shaft which carries the flap.

According to an advantageous feature, the carriage is a plate which is provided with an aperture whose edge which is orientated in the translation direction forms the rack, and whose toothed pinion is accommodated in the aperture in the plane of the plate, the locking recess is produced in a slotted member of the plate.

This embodiment of the carriage is at the same time simple; it can be produced in a laser cut sheet metal plate, which allows the carriage to be produced in a simple manner with its various drive and retention means in order to engage with the toothed segment carried by the shaft of the flap, to co-operate via its slotted member with the roller which constitutes the locking member and with the spring, forming an abutment surface for the spring and guiding it during the compression during the arming movement.

According to another advantageous feature, the slotted member forms a ramp in order to pivot the arm and to repel the lever against the solenoid actuator and engage it at that location by means of magnetic action.

In this manner, the slotted member ensures in particular the dual locking function of the carriage in the armed position owing to its locking recess but, owing to its ramp-like shape, it also allows the locking arm to be pivoted in order to block the lever against the solenoid actuator and thus prepare the engagement movement of the roller in the locking recess in response to the urging action of a spring which acts only on the locking arm.

According to another advantageous feature, the lever is mounted on the pivot which carries the arm and the arm carries a stop for the unlocking lever.

According to another advantageous feature, the lever is provided with a ferromagnetic plate which co-operates with the solenoid actuator. This configuration, which involves separating the production of the counter-plate, that is to say, the ferromagnetic plate which is intended to co-operate with the solenoid actuator and the lever, facilitates the production of the lever and allows it to be produced, for example, as a portion of a perpendicular corner member.

According to another advantageous feature, the carriage comprises a tongue which extends the abutment of the storage spring in order to guide it. This guiding member for the spring is particularly advantageous for safety reasons, in order to prevent any risk of the spring, which must provide significant thrust action, becoming disengaged from its abutment against the carriage owing to flexion.

According to another feature, the unlocking arm is constituted by two plates which are located at one side and the other of the carriage and which together carry the roller which forms the locking member.

The production of the locking arm in the form of two plates which sandwich the portion of the carriage which is provided with the slotted member constitutes an advantageous safety means, in particular for preventing any risk of the abrupt thrust action of the spring at the time of actuation causing the roller to become disengaged from the slotted member either during the rapid travel of the carriage relative to the roller or at the end of its travel.

According to another advantageous feature, the portion of the locking arm comprises a folded lug and the casing accommodates a manual actuation means which is constituted by a shaft which carries a pin which presses against the folded lug of the locking arm, the shaft being provided at the outer side of the casing with a mechanical actuation means in order to rotate this shaft and to bring about the actuation of the actuator.

In one form thereof, the present invention provides a valve actuator, in particular the flap of a fire stop valve which is placed in an arming position and which is actuated by an actuation command associated with an event, having a casing and a drive shaft which is carried by the casing and which is fixedly joined to the flap and connected to a storage spring which is biased into an arming position and which returns the flap into an active position and actuation members which are controlled by events (external temperature, internal temperature, electrical actuation, manual actuation), comprising: a carriage which is guided in translation, which is fixedly joined to the drive shaft in terms of movement by means of a toothed wheel and rack type connection, which is provided with an arming stop, an arming device which is connected to the carriage by means of a connection which can be released by means of an actuation device as soon as the carriage is in an arming position, and a lever which is carried by the casing and which co-operates with the stop of the carriage in order to retain it in an arming position.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein:

FIGS. 4A-4C illustrate the main elements of the actuator, wherein:

FIG. 4A is a plan view;

FIG. 4B is a side view from the left;

FIG. 4C is a bottom view;

FIGS. 6A-6D are partial views of the carriage and the arming member in the various positions of the arming path of the carriage, wherein:

FIG. 6A illustrates the position of the carriage after actuation of the actuator and prior to the arming travel;

FIG. 6B illustrates the arming travel;

FIG. 6C illustrates the end of the arming travel;

FIG. 6D illustrates the removal of the arming member relative to the stop;

FIGS. 7A-7D illustrate four successive characteristic steps of the closure sequence controlled by the actuator, wherein:

FIG. 7A illustrates the arming position;

FIG. 7B illustrates the unlocking position of the carriage;

FIG. 7C illustrates a position of the carriage during the actuation travel;

FIG. 7D illustrates the final position of the carriage in the actuated position;

FIGS. 8A-8D illustrate the characteristic phases of an arming sequence of the actuator, wherein:

FIG. 8A illustrates the actuated position prior to the arming travel;

FIG. 8B illustrates an intermediate arming position;

FIG. 8C is the position of the carriage at the end of the arming travel; and FIG. 8D illustrates the withdrawal of the actuation member.

Figure 1:
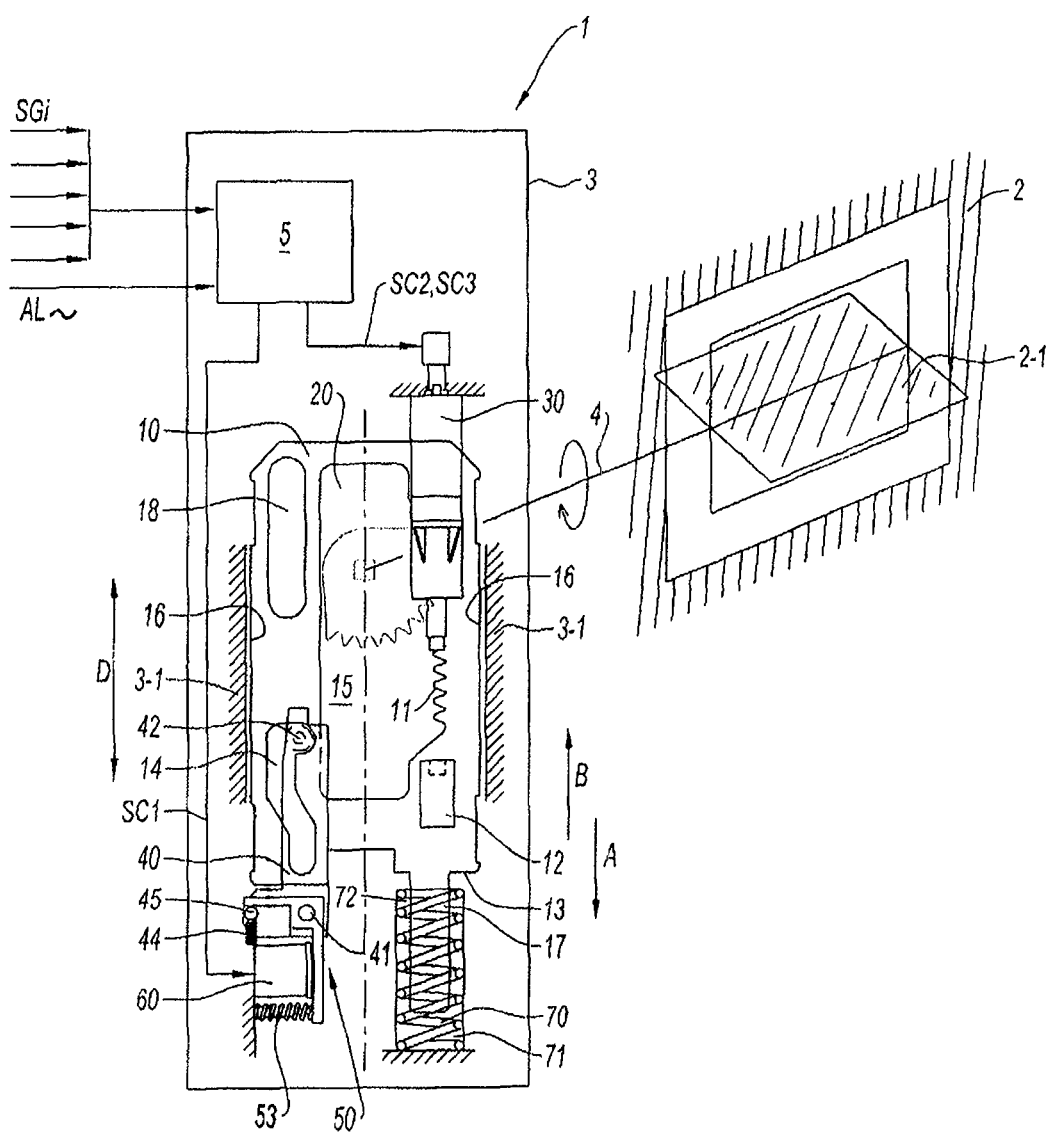
FIG. 1 is a general view of the actuator according to the invention, combined with a fire stop valve.
Figure 5:
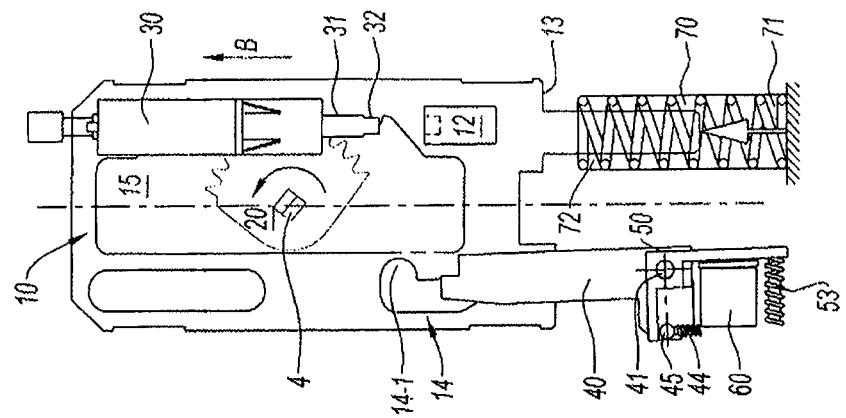
FIG. 5 is a simplified drawing of the carriage and the arming and actuating means acting on the carriage.

Corresponding reference characters indicate corresponding parts throughout the several views. Although the exemplifications set out herein illustrate embodiments of the invention, in several forms, the embodiments disclosed below are not intended to be exhaustive or to be construed as limiting the scope of the invention to the precise forms disclosed.

DETAILED DESCRIPTION

According to FIG. 1, the invention relates to an actuator 1 for controlling the closure of the flap 2-1 of a fire stop valve 2 in accordance with actuation signals which are linked to events such as the external temperature or the internal temperature at one side or the other of the valve, an electrical actuation operation which originates from a central station or other signals of this type, and also manual actuation.

The actuator 1 comprises, accommodated in a casing 3, a control circuit 5 and a carriage 10 which ensure the combination of the actions to be applied to the flap 2-1 of the valve 2. This carriage 10 is normally ready to be actuated in order to drive the flap 2-1 and ensure the closure or, if necessary, after a closure operation, the reopening of the flap.

The actuator 1 comprises an actuation means and an arming means and a closure torque generator.

The arming movement involves placing the carriage in an arming position, storing energy for an optional actuation operation, and placing the valve in an open position.

The actuation movement involves, from the arming position, releasing the actuator, that is to say, the carriage 10 which allows the closure movement of the flap of the valve to be ensured with the stored mechanical energy. The various actions are brought about by means of the carriage 10 which combines the action of the torque generator for the valve, that of the arming means and that of the actuation means, the control of the operations being ensured by the control circuit 5 which receives the SGi signals linked with events, processes these signals and generates control signals SC1, SC2.

A manual actuation of operational control allows the carriage 10 to be released directly regardless of the signals sent by the control circuit 5.

The carriage 10 and the various means are accommodated in the casing 3 which is provided with an arming crank handle which is not illustrated as well as connection means for the sensors which provide the SGi signals and the supply AL which ensures the electrical power supply and also the mechanical connection means between the output shaft 4 and the flap of the valve 2.

According to FIG. 1, the actuator 1 comprises a carriage 10 which is guided in translation in the direction D in order to carry out an arming movement (arrow A) or an actuation movement (arrow B). The carriage 10 comprises: a rack 11 which engages with a pinion 20 which is carried by the output shaft 4 which is connected to the flap 2-1 of the valve 2 and an abutment 13 for a spring 70 which acts as a spring for storage of mechanical actuation energy, acting in the translation direction D in the actuation direction B, an abutment member 12 for an arming member 30 which drives the carriage 10 from the actuated position to the arming position thereof (direction A) in order to become separated at the end of movement of the abutment member 12, and a locking recess 14-1 for receiving a locking member 42 carried by a locking arm 40 which is controlled in the locking direction and unlocking direction by a solenoid actuator 60 in accordance with actuation signals SC1 provided by a control circuit 5.

The locking arm 40 is pivotably mounted about a pivot 41 of the casing 3. The arm 40 is urged by a spring 44 towards the locking position thereof, that is to say, the position in which the locking member 42 thereof is engaged in the locking recess 14-1.

The actuator 1 also comprises a lever 50 which co-operates, on the one hand, with the solenoid actuator 60 which retains the lever in the locking position and, on the other hand, with a spring 53 which urges the lever 50 towards the unlocked position and drives the arm 40 towards the unlocked position thereof.

The actuator 1 comprises a control circuit 5 which ensures the actuation command by a signal SC1 which acts on the solenoid actuator 60 in order to release it briefly and a signal SC2 which controls the actuation member 30 for its arming movement of the carriage 10 then its return movement which releases the carriage 10.

These various means are integrated in the casing 3 which is removably connected to the drive shaft 4 of the flap 2-1 of the valve 2 via an engagement connection by form-fitting, such as interlocking which is not set out in detail.

Figure 2:
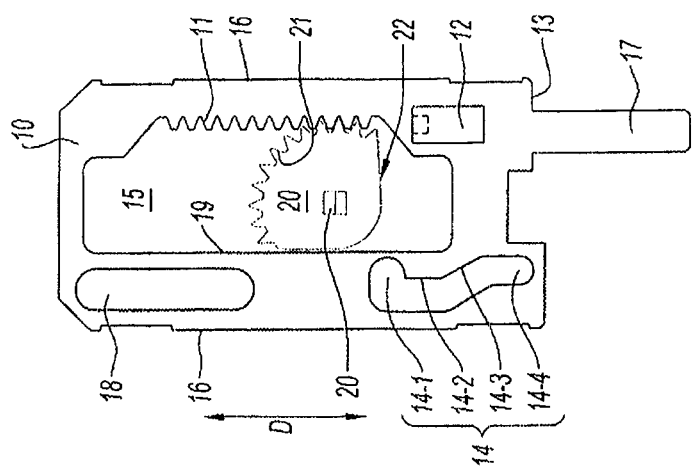
FIG. 2 is a view of the carriage and the drive pinion of the flap.

According to FIGS. 1 and 2, the carriage 10 is constituted by a plate which is in particular composed of sheet metal, which is, for example, laser cut and which is mounted so as to slide between guides 3-1 of the casing 3 with which the carriage 10 co-operates via its sides which form guiding edges 16 and via a rectilinear slotted member 18 which complements the guiding of the carriage and which retains it on the casing via a pin which is not illustrated and which straddles the slotted member 18. The movement direction of the carriage 10 is illustrated by the double-headed arrow D which, depending on the movement direction, corresponds to the arming travel or the actuation travel.

The carriage 10 comprises an aperture 15, one side of which is provided with the rack 11 which is cut in terms of thickness so as to co-operate with the pinion 20 which is constituted by a toothed segment 21. The pinion 20 carried by the output shaft 4 of the actuator is constituted by a plate in the form of a quarter circle sector 22 so that the toothed segment 21 corresponds to the pivoting movement of a quarter-turn of the flap between the open position and the closed position thereof, without reduction of movement whilst being located in the plane of the plate of the carriage 10 and in the space available constituted by the aperture 15 between the rack 11 and the edge 19 of the aperture.

The travel of the carriage 10 can be limited in the actuation direction by a stop which is carried by the casing and, if necessary, by the slotted member 18 or the end of the segment 14-4 of the slotted member 14. The carriage 10 also comprises a tongue 17 which is aligned in the sliding direction D and which acts as a guide for the storage spring 70 which presses via one end 71 against the casing 3 and, via the other end 72, against the abutment 13. The tongue 17 prevents the deflection of the powerful storage spring 70, in particular in the compressed position.

The spring 70 stores mechanical energy which urges the carriage 10 in the actuation direction (arrow B).

One edge of the carriage 10 comprises a slotted member 14 which receives a locking member 42 which is constituted by a roller carried by the locking arm 40 whose operation will be described below. The slotted member 14, which is generally aligned in the sliding direction D of the carriage 10, is composed of an end which forms a recess 14-1, followed by a straight portion 14-2, then a ramp-like portion 14-3 and finally it terminates with a straight portion 14-4. The recess 14-1 is a locking recess to hold the carriage 10 in an arming position co-operating with the roller which constitutes the locking member 42 of the arm and the ramp 14-3 which prepares the engagement position of the carriage 10. Finally, the carriage 10 carries the stop 12 which acts as an abutment for the rearming member 30.

Figure 3C:
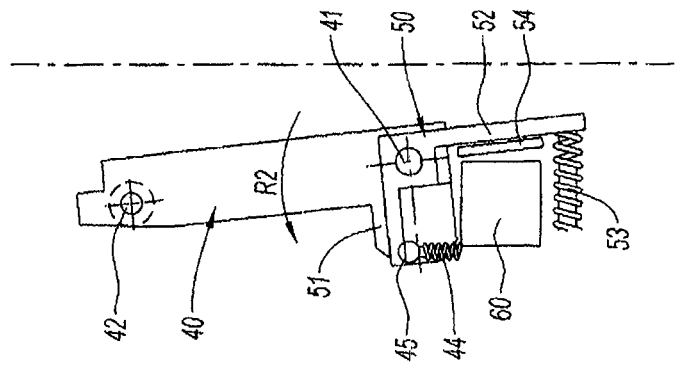
FIG. 3C illustrates the lever released from the solenoid actuator.
Figure 3B:
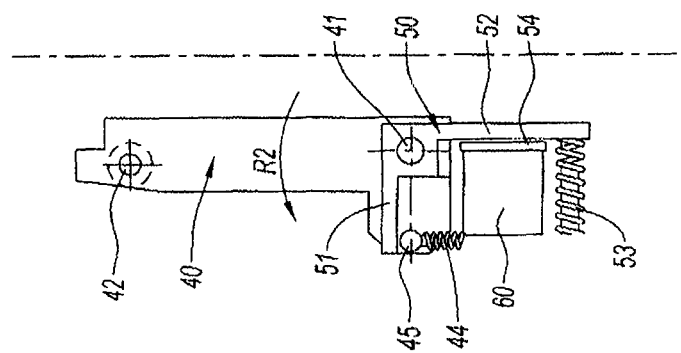
FIG. 3B illustrates the lever engaged with the solenoid actuator.
Figure 3A:
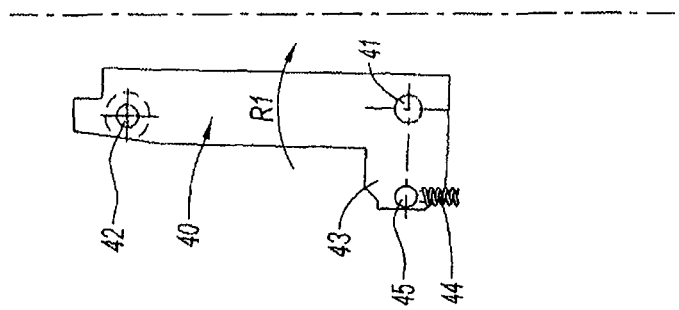
FIG. 3A is a plan view of the locking arm.

The arming and actuation movements of the actuator 1 use a locking arm 40 which is illustrated alone in FIG. 3A and in combination with a lever 50 and the solenoid actuator 60 in two different positions in FIGS. 3B and 3C.

According to FIG. 3A, the locking arm 40 which co-operates with the carriage 10 is formed by a panel which is carried by a pivot 41 which is fixedly joined to the casing. The end of this panel carries the roller 42 which constitutes the locking member which is accommodated in the slotted member 14 of the carriage 10.

The locking arm 40 comprises a branch 43 which is provided with a stop 45 in the form of a pin. The locking arm 40 is urged by a spring 44 in the locking direction (arrow R1).

According to FIG. 3B, the arm 40 co-operates with a lever 50 which is also mounted on the pivot 41 of the arm 40. This lever 50 has two branches 51, 52 in the form of a right-angle in this instance. The first branch 51 co-operates with the stop in the form of a pin 45 of the arm 40 and the second branch 52 co-operates with the solenoid actuator 60. To this end, regardless of the material of the lever 50, the branch 52 carries a ferromagnetic counter-plate 54 which is attracted by the solenoid actuator 60. The solenoid valve 60 is fixed to the casing 3. It normally retains the counter-plate 54 by means of its natural magnetisation and an electrical pulse (signal SC1) applied to the solenoid actuator 60 by the control circuit 5 allows its magnetic field to be neutralised for a short period of time so that the counter-plate 54 is no longer retained.

The second branch 52 of the lever 50 is urged by a spring 53 which acts in the opposite direction to the magnetic attraction applied by the solenoid actuator 60 in order to pivot the arm 40 in the direction R2 about the pivot 41.

It should be emphasised that the spring 44 applied to the lever 40 has the tendency to cause it to pivot in the engagement direction, that is to say, in the direction R1 opposed to the direction R2.

The geometry of the lever 50, the arm 40 and the various elements of this assembly is such that when the lever 50 is retained by the solenoid actuator 60 by way of its counter-plate 54, the arm 40 is urged via its spring 44 so that the stop 45 thereof is pressed against the branch 51 and so that the roller 42 is thereby accommodated in the recess 14-1 of the slotted member 14 and remains held at that location.

In contrast, according to FIG. 3C, when the solenoid actuator 60 has released the ferromagnetic counter-plate 54, the branch 52 of the lever 50 can be repelled by the spring 53 so that, by means of pivoting (R2) about the pivot 41, the branch 51 repels the stop 45 counter to the action of the spring 44, the spring 44 applying a torque which is less than that of the spring 53 relative to the pivot 41. This pivoting movement of the arm 40 in the direction of the arrow R2 thus releases the locking member 42, that is to say, the roller 42 from the locking recess 14-1 of the slotted member. As soon as the counter-plate 51 is disengaged from the solenoid actuator 60, the magnetic field is no longer sufficient to return the counter-plate 54 and the lever 50 against the solenoid actuator 60.

Figure 4C:
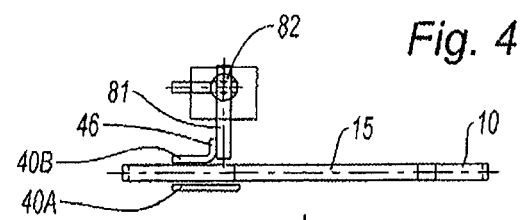
Figure 4A:
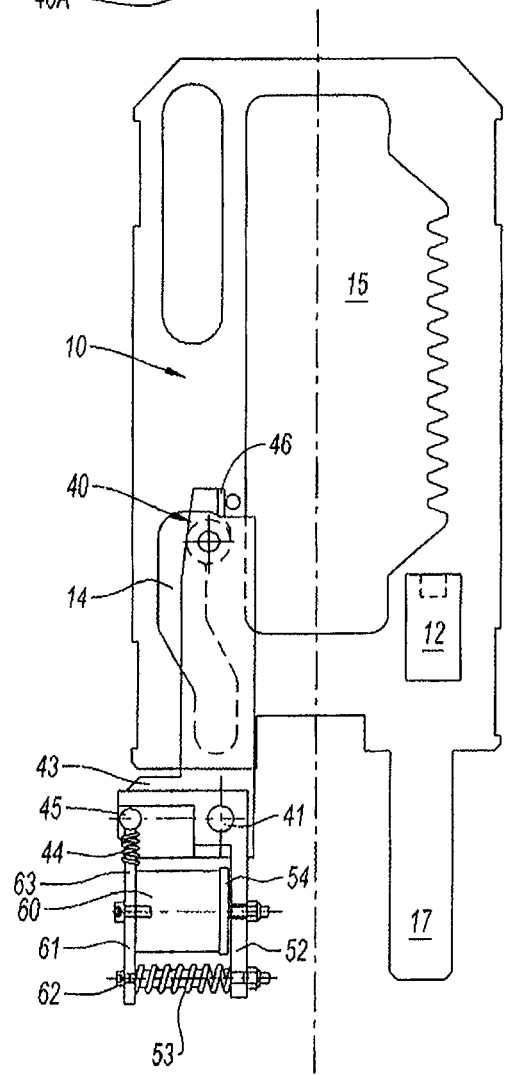
Figure 4B:
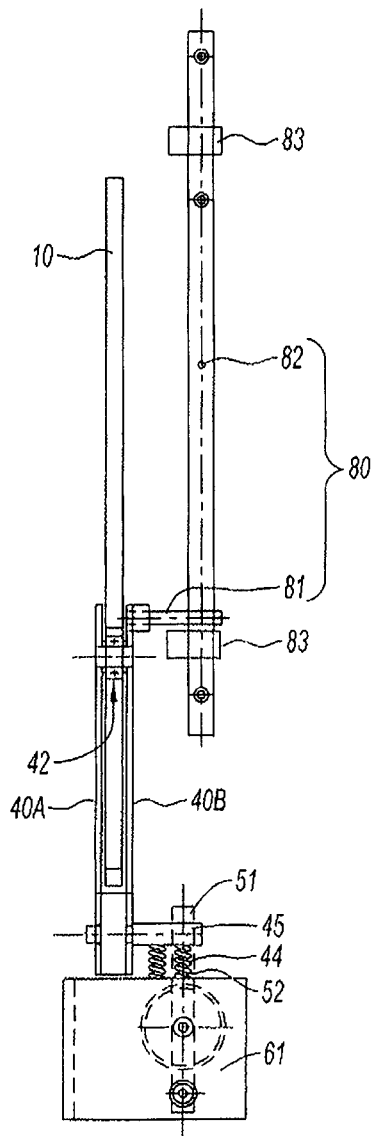

FIGS. 4A-4C illustrate in a detailed manner the elements which co-operate with the carriage 10.

FIG. 4A illustrates the solenoid actuator 60 which is fixed to a lug 61 which is fixedly joined to the casing. The counter-plate 54 is fixed to the branch 52 and the spring 53 is carried by a rod 62 which is fixedly joined to the lug 61. The lug 61 is also provided with a rod 63 which acts as a guide for the spring 44 pushing against the pin 45. This spring and the guide are split (FIG. 4B).

The view from the left according to FIG. 4B illustrates that the locking arm 40 is formed by two plates 40A, B of the same shape at one side and the other of the carriage 10, carrying the roller 42 in their gap. The bottom plate 40B of the locking arm 40 has a folded lug 46 to co-operate with an actuation means 80 which allows mechanical or manual actuation. This actuation means 80 comprises a pin 81 which is pressed against the folded lug 46. This pin is carried by the unlocking shaft 82 which is pivotably mounted in bearings 83. The pivoting of the unlocking shaft 82 repels the folded lug 46 via the pin 81, thus releasing the carriage 10.

The shaft 82 is maneuvered manually via a lever or a similar member at the outer side of the casing 3.

FIG. 4C illustrates the shaft 81, the shaft 82 and the perpendicularly folded lug 46 of the portion 40B of the locking arm 40.

In addition to FIGS. 4A-4C, FIG. 5 illustrates the relative arrangement of the various means acting on the carriage 10, such as the arming member 30, the locking arm 40 and the lever 50 thereof, the solenoid actuator 60, the storage spring 70 and the toothed segment 21 of the pinion 20 which is connected to the output shaft 4 without a manual actuation member 80.

The position illustrated is an intermediate position which is occupied by the carriage 10 following actuation. The carriage 10 is driven in the actuation direction (arrow B) urged by the storage spring 70, the locking arm 40 urged by the unlocking spring 53 which has released the roller from the locking recess 14-1. This Figure illustrates that the stop 12 carried by the carriage 10 has moved closer to the end 32 of the rod 31 of the arming member 30.

The actuation described can be caused by a signal sent by the control circuit 5 or a manual action on the shaft 82 of the manual actuation means 80.

FIGS. 6A-6D illustrate four successive positions which are characteristic of the arming movement (direction A) from the actuated position illustrated in FIG. 6A. The carriage 10 is driven by the arming member 30 which is fixedly joined to the casing and which is constituted by a back-geared motor which is provided with a rod 31 which is moved in translation in the direction A (or then in the direction B) by means of a screw/nut type connection which converts the rotation movement of the motor of the arming member 30 into a translation movement of the rod 31 in the direction which is dependent on the rotation direction of the electric motor, the assembly thus constituting a back-geared motor.

The arming member 30 is in abutment against the stop 12 when the carriage 10 is in an actuated position, the end 32 of the rod 31 being engaged in the housing 12-1 in order to retain the rod 31 during the arming movement.

In accordance with FIG. 6B, the signal SC2 of the control circuit actuates the arming member 30 which repels the carriage 10 towards the arming position thereof (arrow A).

According to FIG. 6C, the rod 32 has guided the carriage 10 into its arming position in which it remains held by the engagement of the locking member 42 of the locking arm 40 in the locking recess 14-1 of the slotted member (as has been seen above).

The travel end position of the rod 31 is detected by a travel end sensor which is not illustrated and which transmits a corresponding signal to the control circuit 5. This stops the rotation of the motor of the arming member 30 and controls (signal SC3) the rotation movement in a reverse manner in order to retract the rod 32.

According to FIG. 6D, the back-geared motor of the actuating member 30 retracts the rod 31 practically as far as its stop position for the carriage 10 moving into the closure position.

The operation of the actuator 1 will be described in detail below for the closure sequence of the flap 2-1 of the valve 2 in accordance with FIGS. 7A-7D and for the opening sequence of the flap using FIGS. 8A-8D illustrating the relative movement of the carriage 10 and the pivoting of the locking arm 40.

FIG. 7A illustrates the initial position of the actuator 1, assumed to be in the locked and armed state, that is to say, engaged. The carriage 10 is retracted. The storage spring 70 is compressed and pushes on the carriage 10 which is immobilised by the engagement of the roller 42 of the locking arm 40 in the recess 14-1 of the slotted member 14 of the carriage 10. The storage spring 70 pushes on the carriage 10 but cannot move it.

According to FIG. 7B, an unlocking pulse (SC1) is sent by the control circuit 5 to the solenoid actuator 60 which thus releases the counter-plate 54 of the second branch 52. The lever 50 is able to pivot in the direction of the arrow R2, repelling the stop 45 counter to the action of its spring 44, which also causes the locking arm 40 to be pivoted in the direction R2. The roller 42 is released from the locking recess 14-1, which releases the sliding action of the carriage 10.

FIG. 7C illustrates that, under the action of the storage spring 70, the carriage 10 is released and moves to the actuated position (direction B), that is to say, the closure position of the flap of the valve 2. The roller 42 first travels along the straight segment 14-2 at the outlet of the locking recess 14-1, then the segment 14-3 which forms a ramp.

The movement of the roller 42 on the ramp 14-3 causes the arm 40 to pivot in the direction of the arrow R1. At the end of the ramp 14-3, the arm 40 will have pivoted and, via its stop 45, it has driven the counter-plate 54 into abutment against the solenoid actuator 60. This movement is carried out counter to the thrust action applied by the spring 53.

FIG. 7D illustrates the counter-plate 54 pressed against the solenoid actuator 60, whose magnet thus blocks the lever 50. The arm 40 remains free for any movement or play which separates the stop 45 from the branch 51, that is to say, any movement in the direction R2.

The movement of the roller 42 in the slotted member 14 is a relative movement, the carriage 10 moving in translation longitudinally in the direction D and the slotted member 14 passing over the roller 42 and forcing it to describe a small circular arc centred on the pivot 41 of the arm 40.

It should be noted that, during the movement illustrated in FIGS. 7A-7D, the pinion 20 has been driven by a quarter-turn by the movement of the plate 10 and the rack 11 thereof.

FIGS. 8A-8D illustrate the opening sequence of the flap 2-1 by the arming movement of the carriage 10 from the closure position of the flap or actuated position illustrated in FIG. 8A (identical to the position of FIG. 7D) in order to arrive at the arming position illustrated in FIG. 8D.

In the closed position according to FIG. 8A, the lever 50 is adhesively bonded via the counter-plate 54 thereof to the solenoid actuator 60 and the roller 42 of the arm 40 is located at the end 14-4 of the slotted member 14. The opening sequence of the flap, that is to say, for arming the actuator, is carried out by means of the actuator which causes the pinion 20 to pivot in the reverse direction to the closure movement by means of its engagement in the rack 11 and the translation movement of the carriage 10 in the arming direction A pushed by the action of the arming member 30. The control circuit 5 acts on the arming member 30 which urges the carriage 10 as far as its arming position by means of its rod 31.

FIG. 8B illustrates an intermediate position during the opening movement. The electromechanical arming member 30 repels the carriage 10 (arrow A) counter to the force developed by the spring 70 and compresses it in order to store energy for future actuation.

The lever 50 is blocked by the solenoid actuator 60 but the arm 40 remains free to pivot about the pivot 41 thereof in order to allow the ramp 14-3 of the slotted member 14 to repel the roller 42, that is to say, the arm 40. The translation movement (arrow A) of the carriage 10 produces the pivoting action of the flap by means of the engagement of the toothed segment 21 in the rack 11.

According to FIG. 8C, the carriage 10 continues its movement beyond the ramp 14-3 on the straight segment 14-4 and counter to the action of the spring 70 so that the roller 42 engages in the recess 14-4 when it is opposite the roller 42; the spring 44 pushes the arm 40 in order to cause it to pivot. During this movement, the lever 50 is fixed since its branch 52 is engaged via the counter-plate 54 against the solenoid actuator 60. The pivoting continues until the stop 45 arrives against the first branch 51 of the lever 50. The geometry of the components is configured so that, in this position, the roller 42 is at the base of the locking recess 14-1 of the slotted member 14.

The movement of the carriage 10 is ensured by the arming member 30 as far as this position of the carriage 10 that corresponds to the opening position of the flap 2-1 of the valve 2.

According to FIG. 8D, the control circuit 5 detects the travel end position of the carriage 10 in the arming direction and that of the rod 31. It stops the motor of the actuating member 30 then reverses the rotation direction thereof in order to retract the rod 31 and thus to release the carriage 10 for a future actuation operation. The carriage 10 is in the arming position.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

LIST OF REFERENCE NUMERALS

1 Actuator
2 Valve
2-1 Flap
3 Casing
3-1 Guide
4 Output shaft of casing
5 Control circuit
10 Carriage
11 Rack
12 Stop for arming member
13 Storage spring abutment
14 Slotted member
14-1 Locking recess
14-2 Straight segment
14-3 Ramp
14-4 Segment
15 Aperture
16 Guiding edge
17 Tongue
18 Rectilinear slotted member
20 Pinion
21 Toothed segment
22 Quarter-circle sector
30 Arming member
31 Rod
32 End of the rod
40 Locking arm
40A Plate
40B Plate
41 Pivot
42 Locking member (roller)
43 Branch
44 Spring
45 Stop
46 Folded lug
50 Lever
51 First branch
52 Second branch
53 Spring
54 Counter-plate
60 Solenoid actuator
61 Lug
62 Rod
70 Storage spring
80,90 Mechanical actuation means
81,91 Pin
82,92 Unlocking shaft
83,93 Bearing

The invention claimed is:

1. Valve actuator, for a flap of a fire stop valve which is placed in an arming position and which is actuated by an actuation command associated with an event, having a casing (3) and a drive shaft (4) which is carried by the casing (3) and which is fixedly joined to the flap (2-1) and connected to a mechanical actuation energy storage spring (70) which is biased into the arming position and which returns the flap (2-1) into an active position and actuation members (60-80) which are controlled by events (external temperature, internal temperature, electrical actuation and/or manual actuation), comprising:

a carriage which is guided in translation,
which is fixedly joined to the drive shaft comprises a rack (11) which engages with a toothed pinion (20) of the output shaft (4) which is connected to the flap (2-1) of the valve (2),
which is provided with an arming stop,
an arming device which is connected to the carriage by means of a connection which can be released by means of an actuation device as soon as the carriage is in the arming position, and
a lever which is carried by the casing and which co-operates with the stop of the carriage in order to retain it in the arming position,
characterised in that
the carriage (10) which is guided in translation (in direction D) in the casing (3) between the arming position (direction A) and the actuated position (direction B) comprises:
an abutment (13) for the mechanical actuation energy storage spring (70),
an abutment member (12) for the arming member (30) which drives the carriage (10) from its actuated position to its arming position in order to then become separated from the abutment member (12) at the end of the arming travel, a locking recess (14-1) for receiving a locking member (42) which is carried by a locking arm (40), which is pivotably mounted in the casing (3) and which is urged by a spring (44) towards a locking position thereof, an unlocking lever (50) which is mounted in the casing and which co-operates, on the one hand, with a solenoid actuator (60) which retains the lever in the locking position and, on the other hand, with a spring (53) which urges the lever (50) towards an unlocked position and drives the arm (40) towards the unlocked position, a control circuit (5) which provides the actuation command by means of an action on the solenoid valve (60) and on the actuation member (30) for the arming movement of the carriage (10).

2. Actuator according to claim 1, characterised in that the carriage (10) is a plate which is provided with an aperture (15) whose edge which is orientated in the translation direction (D) forms the rack (11) and whose toothed pinion (20) is accommodated in the aperture (15) in the plane of the plate.

3. Actuator according to claim 2, characterised in that the locking recess (14-1) is produced in a slotted member (14) of the plate, and the slotted member (14) forms a ramp (14-3) in order to pivot the arm (40) and repel the lever (50) against the solenoid valve (60) and to engage it at that location by means of magnetic action.

4. Actuator according to claim 1, characterised in that the lever (50) is mounted on a pivot (41) which carries the arm (40) and the arm carries a stop (46) for the unlocking lever (50).

5. Actuator according to claim 1, characterised in that the unlocking lever (50) is provided with a ferromagnetic plate (54) which co-operates with the solenoid actuator (60).

6. Actuator according to claim 1, characterised in that the carriage (10) comprises a tongue (17) which extends the abutment (13) of the storage spring (70) in order to guide it.

7. Actuator according to claim 1, characterised in that the unlocking arm (40) is constituted by two plates (40A, 40B) which are located at one side and the other of the carriage and which together carry a roller (42) which forms the locking member.

8. Actuator according to claim 7, characterised in that a portion (40B) of the locking arm comprises a folded lug (46) and the casing (3) accommodates a manual actuation means which is constituted by an unlocking shaft (82) which carries a pin (81) which presses against a folded lug (46) of the locking arm, the shaft (82) being provided at the outer side of the casing with a mechanical actuation means in order to rotate this shaft and to bring about the actuation of the actuator.

* * * * *